United States Patent
Horiuchi et al.

(10) Patent No.: US 7,959,199 B2
(45) Date of Patent: Jun. 14, 2011

(54) FINGER UNIT FOR ROBOT HAND AND METHOD OF ASSEMBLING THE SAME

(75) Inventors: Masashi Horiuchi, Azumino (JP); Toshihiro Hirabayashi, Azumino (JP); Hirokazu Ohta, Toyota (JP); Morihiko Ohkura, Toyota (JP)

(73) Assignees: Harmonic Drive Systems Inc., Tokyo (JP); Toyota Jidosha Kabushiki Kaisha, Aichi-Ken (JP)

( * ) Notice: Subject to any disclaimer, the term of this patent is extended or adjusted under 35 U.S.C. 154(b) by 661 days.

(21) Appl. No.: 11/994,532

(22) PCT Filed: Nov. 30, 2006

(86) PCT No.: PCT/JP2006/323893
§ 371 (c)(1),
(2), (4) Date: Jan. 3, 2008

(87) PCT Pub. No.: WO2007/077697
PCT Pub. Date: Jul. 12, 2007

(65) Prior Publication Data
US 2009/0114054 A1    May 7, 2009

(30) Foreign Application Priority Data
Dec. 28, 2005  (JP) ................................ 2005-379771

(51) Int. Cl.
*B25J 15/08* (2006.01)
(52) U.S. Cl. .......................................... 294/106; 901/38
(58) Field of Classification Search ................. 294/106; 901/31, 36, 38, 39; 623/64
See application file for complete search history.

(56) References Cited

U.S. PATENT DOCUMENTS 3,572,807 A * 3/1971 Haaker et al. ................. 294/106
4,573,727 A * 3/1986 Iikura ........................... 294/115
(Continued)

FOREIGN PATENT DOCUMENTS

JP          52-24659 A     2/1977
(Continued)

OTHER PUBLICATIONS

Supplementary European Search Report in corresponding application No. 06833696.5-2316 dated Jan. 7, 2009.

(Continued)

*Primary Examiner* — Dean J Kramer
(74) *Attorney, Agent, or Firm* — Buchanan Ingersoll & Rooney PC

(57) ABSTRACT

A multi-joint finger unit (1) has first and second joint sections (3, 5) constructed by using bevel gears. In each joint section (3, 5), the section where a driving bevel gear (10, 44) and a driven bevel gear (14, 56) mesh with each other and also a bearing section of a joint shaft (15, 57) are assembled in a tubular housing (13, 51) whose forward end is closed. Rear end openings (13A, 52) of the tubular housings (13, 51) are closed by a tubular housing (7) at a finger root and a tubular housing (41) at a finger body section. The section where the gears of the joint sections (3, 5) mesh and the bearing section are substantially sealed, so that a foreign matter is prevented from entering from the outside to these sections and lubricant does not leaks from these sections. The multi-joint finger unit is suitable for use in place where thick powder dust is present and in a clean room.

10 Claims, 4 Drawing Sheets

U.S. PATENT DOCUMENTS

| | | | |
|---|---|---|---|
| 4,972,735 A * | 11/1990 | Torii et al. | 74/665 M |
| 5,437,490 A * | 8/1995 | Mimura et al. | 294/106 |
| 7,077,446 B2 * | 7/2006 | Kameda et al. | 294/106 |
| 7,556,299 B2 * | 7/2009 | Koyama | 294/106 |
| 2004/0103740 A1 | 6/2004 | Townsend et al. | |
| 2005/0040664 A1 | 2/2005 | Kameda et al. | |

FOREIGN PATENT DOCUMENTS

| | | |
|---|---|---|
| JP | 61-182789 A | 8/1986 |
| JP | 2-24151 U | 2/1990 |
| JP | 11-201242 A | 7/1999 |
| JP | 2000-035106 A | 2/2000 |
| JP | 2001-124155 A | 5/2001 |
| JP | 2004-122339 A | 4/2004 |
| JP | 2004-181610 A | 7/2004 |

OTHER PUBLICATIONS

Form PCT/ISA/210 (International Search Report) dated Feb. 27, 2007.

* cited by examiner

FINGER UNIT FOR ROBOT HAND AND METHOD OF ASSEMBLING THE SAME

TECHNICAL FIELD

The present invention relates to a finger unit for a robot hand that is capable of accurately catching flying objects at high speeds, and to a method of assembling the same.

BACKGROUND ART

Finger units used in robot hands are typically of a multi-joint construction. Multi-joint finger units must be small-sized and lightweight in order for them to be capable of performing actions of gripping, picking, and throwing physical objects reliably at high speed.

Finger units used for such purposes and palm mechanisms for robot hands in which such units are employed are disclosed in Patent References 1 and 2 below.

[Patent Reference 1] JP-A 2004-122339
[Patent Reference 2] JP-A 2004-181610

Bevel gears are used in joint sections in the finger units described in the above patent references. A linking member is attached to a rotating shaft of the bevel gears in a position between bearings that support the rotating shaft. A finger body is attached to a forward end of the linking member. The finger body is caused to swivel around the rotating shaft of the bevel gears.

The robot hand may be used in an environment wherein thick powder dust is present. In such cases, foreign matter enters from the outside into a section where the bevel gears mesh and into a bearing section of the rotating shaft of the bevel gears. These sections constitute joint sections of the finger units of the robot hand. A problem is presented in regard to the high likelihood that poor meshing will occur, a bearing will malfunction, or other adverse circumstances will arise.

In the case that a robot hand is used in a clean room, a lubricant that has been supplied or applied to the bearing sections and bevel gear meshing sections in the joint sections will be scattered, and a problem will be presented in that the cleanliness of the clean room will be compromised.

DISCLOSURE OF THE INVENTION

It is an object of the present invention to provide a finger unit for a robot hand that is able to eliminate the incidence of such problems, and is of a lightweight and compact construction; and also to provide a method of assembling the same.

In order to accomplish the aforesaid object, the finger unit for a robot hand of the present invention is characterized in comprising:

a rotation actuator;

a driving bevel gear, which is secured in a coaxial state to a forward end section of a rotation output shaft of the rotation actuator;

a joint shaft that is arranged in a direction that is perpendicular to a central axis line of the rotation output shaft;

a driven bevel gear, which is secured in a coaxial state to the joint shaft, and which meshes with the driving bevel gear;

a swivel arm, which is linked to the joint shaft, and which extends in a direction that is perpendicular to the joint shaft;

a finger body, which is linked to the swivel arm; and a tubular housing having a closed forward end section and a rear end constituting an opening, wherein the joint shaft, the driven bevel gear, and the driving bevel gear are accommodated in the tubular housing;

at least a first shaft end section of shaft end sections of the joint shaft passes through the tubular housing and protrudes outward, and the swivel arm is linked to the first shaft end section on an exterior of the tubular housing; and the opening of the tubular housing is closed by the rotation actuator attached to the tubular housing.

According to the present invention, the pair of bevel gears and the joint shaft that constitute the joint section of the finger unit are accommodated in a tubular housing whose forward end is closed. An opening in a rear end of the tubular housing is closed by a rotation actuator, which is fastened and secured to the tubular housing. Accordingly, foreign matter is prevented from entering from the outside into the mesh section and the rotating and sliding sections of the joint section. Lubricant is also prevented from being scattered outward from these sections. It is accordingly possible to produce a lightweight and compact finger unit for a robot hand, which is suitable for use in a place where thick powder dust is present and in a clean room.

Here, the finger unit for a robot hand of the present invention is characterized in that:

the tubular housing is formed with first and second openings in positions on either end of the joint shaft in an axis line direction, and a size of the second opening is made to allow the driven bevel gear to be inserted therethrough;

the first shaft end section protrudes to the exterior of the tubular housing via the first opening;

the first shaft end section of the joint shaft is rotatably supported by a first bearing, which is attached at a site on an interior of the first opening in the tubular housing;

a gap between the first opening and the joint shaft is sealed off using an oil seal;

the second opening is closed by a cover member, which is screwed securely to the second opening; and a second shaft end section of the joint shaft is rotatably supported by a second bearing, which is attached to a circular recessed section formed on an interior end surface of the cover member.

According to this arrangement, the outer side of one of the shaft bearings for rotatably supporting the joint shaft is sealed using an oil seal, and the other bearing is shielded from the exterior by a cover member. The shaft bearing section is accordingly shielded from the exterior, whereby foreign matter can be reliably prevented from entering the shaft bearing section from the exterior, and lubricant or the like can be reliably prevented from being scattered from the shaft bearing section to the exterior. Moreover, the tasks associated with incorporating the joint shaft, the driven bevel gear, and the first and second bearings within the tubular housing can be performed straightforwardly via the large second opening.

The finger unit for a robot hand of the present invention is further characterized in that the forward end section of the tubular housing is an arcuate forward end section, which protrudes in an arcuate shape around the joint shaft; the only section of the arcuate forward end section that covers the driven bevel gear is a second arcuate forward end section, whose radius is larger than a first arcuate forward end section; and a rear end of the finger body is configured so as to swivel around the joint shaft and along an exterior surface of the first arcuate forward end section.

If the entirety of the forward end section of the tubular housing is an arcuate forward end that is large enough to cover the driven bevel gear, then a large amount of dead space will inevitably be formed within the housing in an outer peripheral region of the joint shaft to which the driven bevel gear is not attached. The finger body attached to a forward end of a swivel arm must be set apart from the joint shaft so as to be able to swivel without interfering with the forward end section. The swivel arm must accordingly be lengthened. Moreover, if the swivel arm is lengthened, the maximum output torque of the rotation actuator will be restricted, thereby preventing an increase in thrust.

According to the present invention, sections other than the driven bevel gear are covered by a small-diameter arcuate forward end section, and the finger body is allowed to swivel along the exterior surface thereof. Extraneous space within the tubular housing can accordingly be eliminated. Moreover, the finger body can be brought closer to the joint shaft, and the length of the swivel arm can accordingly be reduced. The load torque can be lowered, and thrust can be increased.

In order to adjust the state in which the driven bevel gear and the driving bevel gear mesh with each other, or other states, a shim plate may be inserted between the driving bevel gear and a forward surface of the forward end of the rotation actuator.

The finger unit of the robot hand having the above construction is readily assembled as described hereunder. Specifically, a method of assembling the finger unit for a robot hand of the present invention is characterized in comprising: incorporating the driven bevel gear along with the first and second bearings on the joint shaft; inserting and positioning these parts in the tubular housing via the second opening; screwing and securing the cover member on the second opening; mounting the oil seal; inserting, via the opening in the rear end of the tubular housing, a forward end section of the rotation actuator to which the driving bevel gear and shim plate have been attached, and causing the driving bevel gear to mesh with the driven bevel gear; and fastening and securing the rotation actuator to the tubular housing.

The finger unit for a robot hand of the present invention is also characterized in that: first and second swivel arms are provided as the swivel arm; the first shaft end section and the second shaft end section of the joint shaft both protrude from the tubular housing; the first swivel arm is secured to the first shaft end section; and the second swivel arm is secured to the second shaft end section.

In this case, the first and second openings are formed on the two end positions along an axis line direction of the joint shaft in the tubular housing; the first shaft end section protrudes through the first opening, and the second shaft end section protrudes through the second opening; the first shaft bearing, which is mounted between an inner peripheral surface of the first opening and the first shaft end section, and the second shaft bearing, which is mounted between an inner peripheral surface of the second opening and the second shaft end section, support the joint shaft in a rotatable state; and movement in the axis line direction of the first and second shaft bearings is able to be restricted by the first swivel arm and the second swivel arm.

The forward end sections of the first and second swivel arms are bent in the axis line direction of the joint shaft, and extend towards one another. The forward end sections can be linked and secured to one another. According to this arrangement, the body formed from the linked first and second swivel arms can be used as a fingertip.

In order to adjust the state in which the driven bevel gear and the driving bevel gear are enmeshed, or other parameters, a shim plate may be inserted between the driving bevel gear and a forward surface of the forward end of the main body of the rotation actuator.

The method of assembling the finger unit for a robot hand having the above configuration is characterized in comprising: incorporating the driven bevel gear and the second bearing on the joint shaft; inserting and positioning the sections in the tubular housing via the second opening; mounting the first bearing between the first opening and the first shaft end section from the exterior; securing the first swivel arm and second swivel arm to the first and second shaft end sections; inserting, via the opening in the rear end of the tubular housing, a forward end section of the rotation actuator to which the driving bevel gear and shim plate have been attached, and causing the driving bevel gear to mesh with the driven bevel gear; and securing the rotation actuator to the tubular housing.

According to the finger unit of the robot hand of the present invention, the joint sections thereof are covered by tubular housings, and openings on the rear ends of these housings are closed by the forward end sections of the main bodies of the rotation actuators fastened and secured thereto. A finger unit comprising substantially sealed joint sections can accordingly be obtained. It is therefore possible to produce a lightweight and compact finger unit for a robot hand that is suitable for use in a place where thick powder dust is present and in a clean room. Moreover, using a shaft bearing fitted with a seal makes it possible to prevent powder dust from entering and lubricant or the like from scattering.

BEST MODE FOR CARRYING OUT THE INVENTION

A description shall be provided below with reference to the accompanying drawings for the multi-joint finger unit of the high-speed robot hand in which the present invention is employed.

Figure 1A:
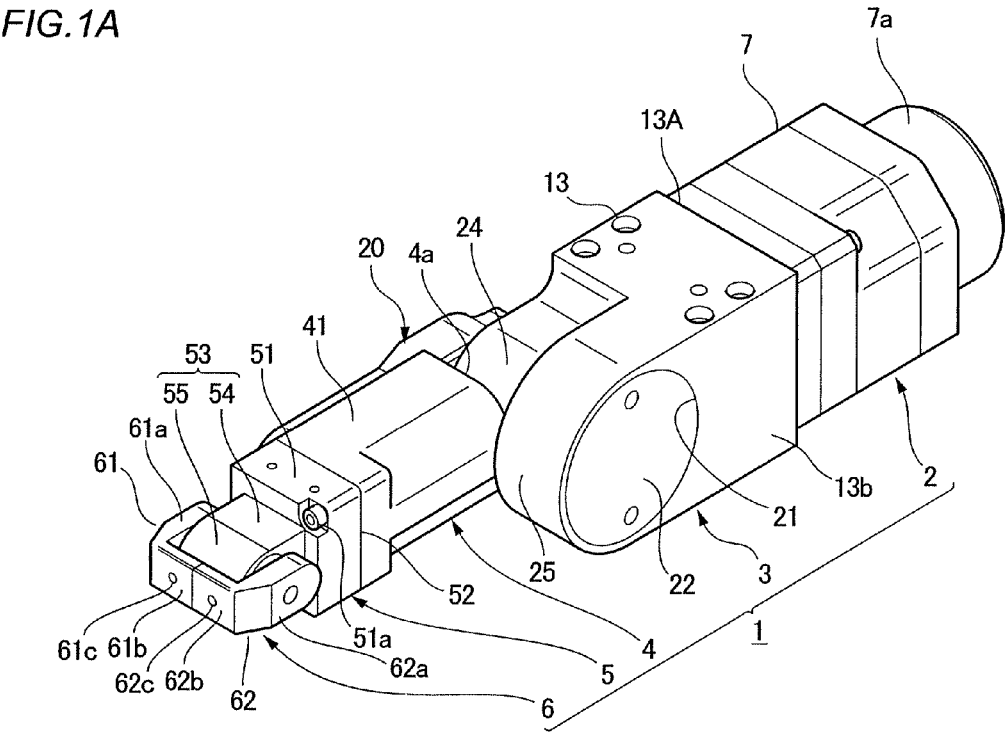
FIG. 1A is an exterior perspective view showing a front surface of a multi-joint finger unit of a high-speed robot hand in which the present invention is employed.
Figure 1B:
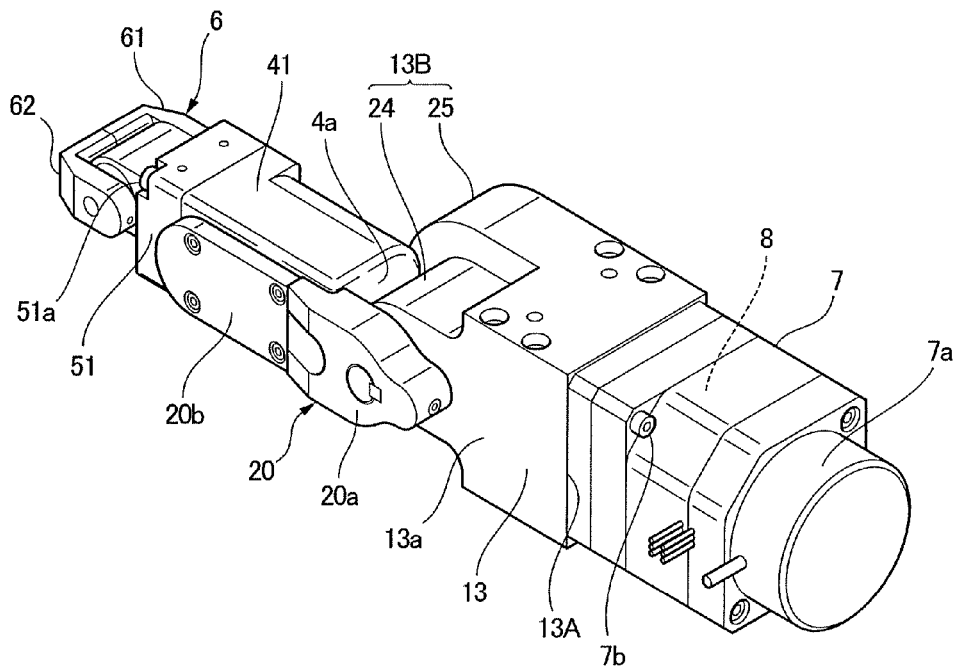
FIG. 1B is an exterior perspective view showing a rear surface of the multi-joint finger unit of the high-speed robot hand shown in FIG. 1A.
Figure 2D:
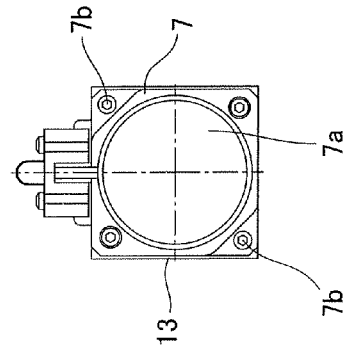
FIG. 2D is an end surface view of a rear end of the multi-joint finger unit shown in FIG. 1A.
Figure 2B:
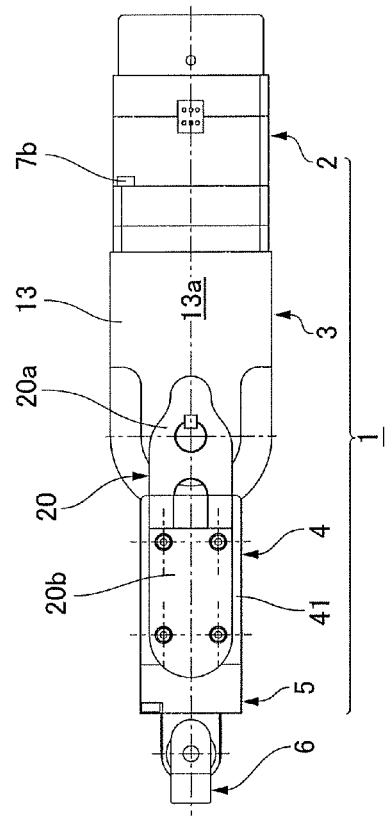
FIG. 2B is a lateral view of the multi-joint finger unit shown in FIG. 1A.
Figure 2A:
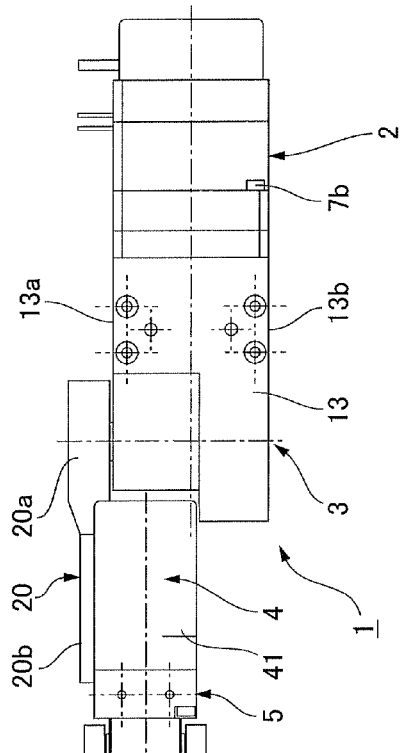
FIG. 2A is a plan view of the multi-joint finger unit shown in FIG. 1A.
Figure 2C:
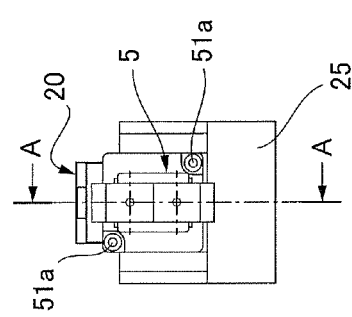
FIG. 2C is an end surface view of a forward end of the multi-joint finger unit shown in FIG. 1A.
Figure 3:
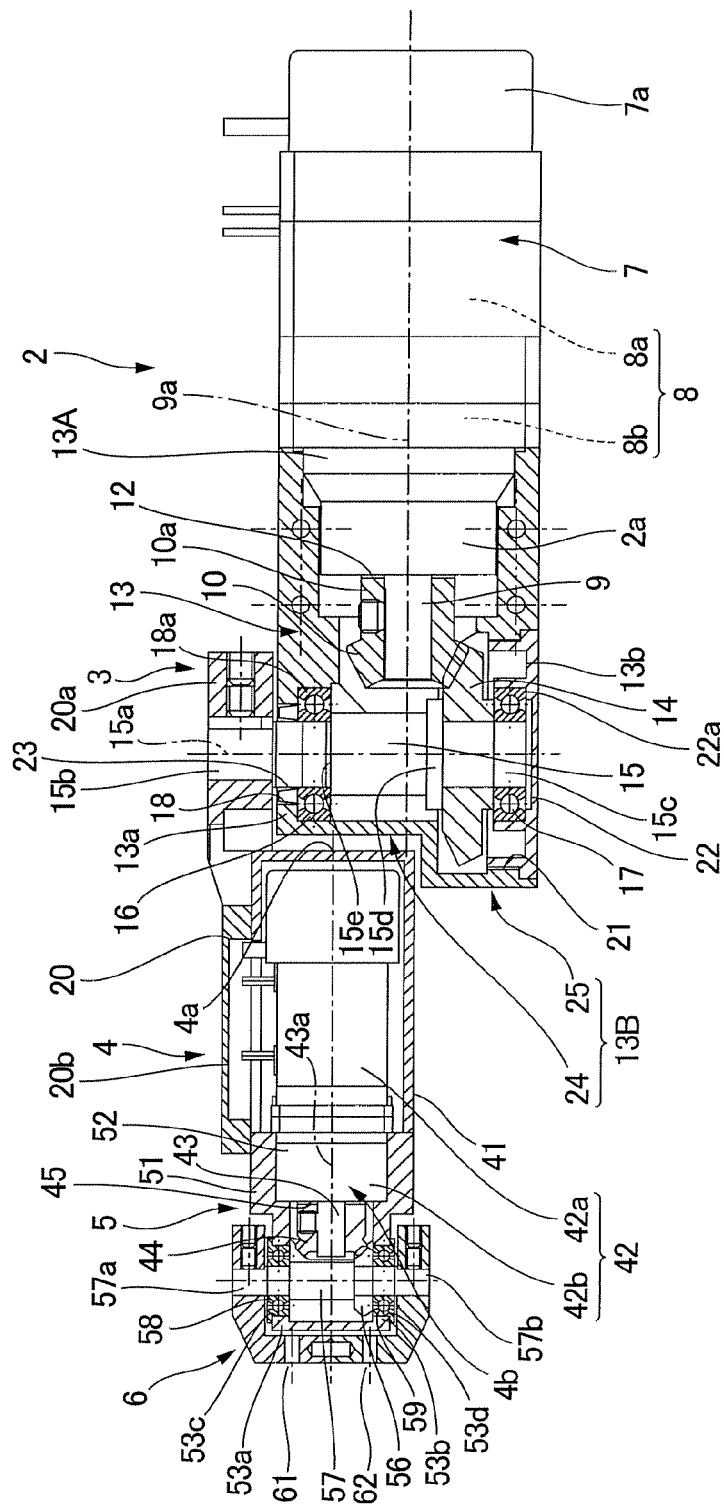
FIG. 3 is a vertical sectional view of a multi-joint finger unit wherein the diagram in FIG. 2C is cut along line A-A.
Figure 4:
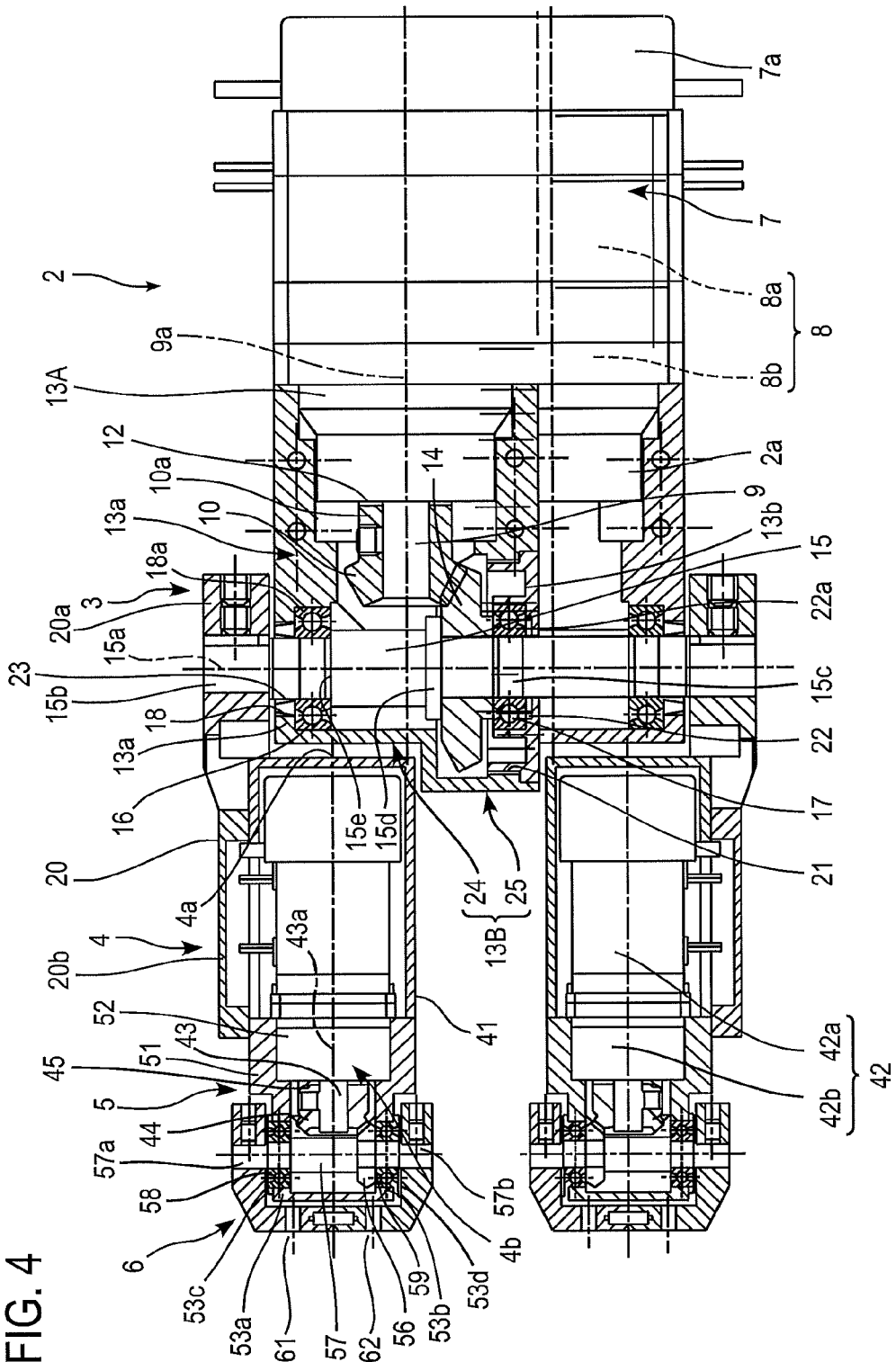
FIG. 4 is a view of a multi-joint finger unit including first and second swivel arms.

FIGS. 1A and 1B are exterior perspective views showing a front surface and rear surface of a multi-joint finger unit of a high-speed robot hand according to the present embodiment. FIGS. 2A through 2D are a plan view, lateral view, forward-wide end view, and rear-side end view of the multi-joint finger unit. FIG. 3 is a vertical sectional view showing FIG. 2C cut along line A-A.

A multi-joint finger unit 1 is a two-joint finger unit comprising a finger root 2; a first joint section 3 attached to a forward end of the finger root 2; a finger body section 4 attached to a forward end of the first joint section 3; a second joint section 5 attached to a forward end of the finger body section 4; and a fingertip section 6 attached to a forward end of the second joint section 5.

In the finger root 2, a rotation actuator 8 constructed using a motor 8a and a transmission 8b linked in a coaxial state is housed within a tubular housing 7 that is overall rectangular in shape. A cup-shaped encoder case 7a is attached in a coaxial state to a rear end of the tubular housing 7. As can be seen from FIG. 3, a rotation output shaft 9 protrudes forward from a forward end 2a of the rotation actuator 8. A driving bevel gear 10 is coaxially secured to the rotation output shaft 9. As required, a shim plate 12 may be inserted between a rear end surface of a hollow gear shaft 10a of the driving bevel gear 10 and the forward end 2a.

The first joint section 3 comprises a tubular housing 13 that has a rectangular cross-section. An opening 13A on a rear end thereof is closed by the tubular housing 7 of the finger root 2. The tubular housing 13 is fastened and secured in this state to the tubular housing 7 of the finger root 2 using two fastening screws 7b.

As can be seen in FIG. 3, A driven bevel gear 14 that meshes with the driving bevel gear 10, which is inserted via the rear-end opening 13A, is disposed in the interior of the tubular housing 13. The driven bevel gear 14 is coaxially secured to a joint shaft 15, which is arranged in a direction that is perpendicular to an axis line 9a of the rotation output shaft 9. The joint shaft 15 spans between left and right lateral plate sections 13a, 13b of the tubular housing 13. The lateral plate sections are disposed on either end in the direction of an axis line 15a of the joint shaft 15. The joint shaft 15 is supported in a rotatable state between a first shaft bearing 16, which is disposed on the lateral plate section 13a and a second shaft bearing 17, which is disposed on the lateral plate section 13b.

A first shaft end section 15b of the joint shaft 15 on the lateral plate section 13a protrudes outward from an opening 18 formed in the lateral plate section 13a. A rear-end part 20a of a swivel arm 20 is secured to the first shaft end section 15b. The swivel arm 20 extends in a direction perpendicular to the joint shaft 15, and forms an integrated structure with the finger body section 4. A cover 20b is attached to the swivel arm 20 in order to prevent the ingress of powder dust or the clamping of signal lines or actuation lines associated with a rotation actuator 42 disposed in the finger body section. The swivel arm 20 and the finger body section 4 may have separate structures so that the sections may be more readily worked.

A circular opening 21 large enough to admit the driven bevel gear 14 is formed in the other lateral plate section 13b of the tubular housing 13. The circular opening 21 is a screw hole having an inner peripheral surface into which a female thread has been machined. A circular cover member 22 is screwed into and secured in the circular opening 21, which is thereby closed. A circular recess 22a is formed concentrically on an inside surface of the circular cover member 22. The second shaft bearing 17 is mounted in the circular recess 22a. A second shaft end section 15c of the joint shaft 15 is supported in a rotatable state via the second shaft bearing 17. The driven bevel gear 14 is mounted on an adjoining section of the second shaft end section 15c of the joint shaft 15. The driven bevel gear 14 is in a state of being held between a large-diameter flange 15d formed on the joint shaft 15 and the second shaft bearing 17.

The first shaft bearing 16 that supports the joint shaft 15 on the other side is mounted in a circular recess 18a, which is formed on an inside surface of the opening 18 of the lateral plate section 13a. The circular recess 18a is slightly larger than the opening 18. The first shaft bearing 16 is in a state of being held between a bottom surface of the annular recess and an annular step surface 15e formed on the joint shaft 15. A gap between a shaft section of the joint shaft 15 passing through the opening 18 and an inner peripheral surface of the opening 18 is sealed using an oil seal 23 mounted therein.

As can be seen in FIGS. 1B and 3, a forward end section 13B of the tubular housing 13 is a forward end section that protrudes in an arcuate form. In the present embodiment, the arcuate forward end section 13B comprises a first fixed-width arcuate forward end section 24, which covers sections of the joint shaft 15 other than the driven bevel gear 14; and a second fixed-width arcuate forward end section 25, which covers sections of the driven bevel gear 14. The first and second arcuate forward end sections 24, 25 are defined by an arcuate surface of the joint shaft 15 centered on the axis line 15a. The diameter of the first arcuate forward end section 24 is smaller than that of the second arcuate forward end section 25.

The finger body section 4 comprises a tubular housing 41 whose entirety is substantially rectangular, and the rotation actuator 42, which is disposed therein. The finger body section 4 is of substantially the same width as the first arcuate forward end section 24 on the forward end of the tubular housing of the first joint section 3. A rear-end section 4a of the finger body section 4 is positioned nearer to the joint shaft 15 than to the second arcuate forward end section 25. The rear-end section 4a accordingly describes a swiveling locus across a surface of the first arcuate forward end section 24, which has a smaller diameter than the second arcuate forward end section 25.

The rotation actuator 42 is the same mechanism as the rotation actuator 8 of the finger root 2 described above, and comprises a motor 42a and a transmission 42b. A driving bevel gear 44 is secured in a coaxial state to a rotation output shaft 43, which protrudes from a forward end of the rotation actuator 42.

The second joint section 5, which is attached to a forward end of the finger body section 4, comprises a tubular housing 51 having a rectangular cross-section. The tubular housing 51 is fastened and secured to the tubular housing 41 of the finger body section 4 using two fastening screws 51a in a state wherein a forward end 4b of the finger body section 4 has been inserted in a coaxial state into a rectangular opening 52 on a rear end of the tubular housing 51. A forward end 53 of the tubular housing 51 is defined by a rectangularly tubular section 54, which is slightly smaller than the forward end 51, and an arcuate section 55, which closes a forward end of the rectangularly tubular section 54. A driven bevel gear 56, which meshes with the driving bevel gear 44 attached to the forward end of the rotation output shaft 43, is disposed within the forward end 53. The driven bevel gear 56 is secured in a coaxial state to a joint shaft 57, which extends in a direction perpendicular to an axis line 43a of the rotation output shaft 43.

Circular openings 53c, 53d are formed, respectively, on side plate sections 53a, 53b, which are positioned on either end of the forward end 53 in an axis line direction of the joint shaft 57. A first bearing 58 and a second bearing 59 are mounted from the exterior via the circular openings 53c, 53d. The two shaft end sections of the joint shaft 57 are supported in a rotatable state by the bearings 58, 59. Shaft end sections 57a, 57b of the joint shaft 57 protrude outward from the bearings 58, 59. The fingertip section 6 is attached to the shaft end sections 57a, 57b.

The fingertip section 6 comprises a first swivel arm 61 and a second swivel arm 62, which are in a bilaterally symmetric configuration. The swivel arms 61, 62 comprise rear sections 61a, 62a, which are secured to the shaft end sections 57a, 57b of the joint shaft 57; and front sections 61b, 62b, which extend forward from the rear sections 61a, 62a, and which bend at right angles inward toward one another. The forward end surfaces of the front sections 61b, 62b are linked and secured in a state of mutual contact. Female threads 61c, 62c, which are used for connecting components, are provided to front surfaces of the front sections 61b, 62b. A bolt or the like can be used to connect a fingertip component (not shown) to the front sections 61*b*, 62*b*. The fingertip component may be of any configuration or material suited to a workpiece. Connecting the fingertip component to the front sections 61*b*, 62*b* using a bolt or the like allows the swivel arms 61, 62 to function as linking arms for the fingertip component (Method of Assembling First Joint Section)

The parts of the first joint section 3 having the aforedescribed structure can be assembled as described hereunder. First, the first shaft bearing 16 is mounted from the first shaft end section 15*b* side of the joint shaft 15. The driven bevel gear 14 and second shaft bearing 17 are mounted in the stated order from the second shaft end section 15*c* side of the joint shaft 15. The joint shaft 15, to which is attached the first shaft bearing 16, second shaft bearing 17, and driven bevel gear 14, is inserted via the circular opening 21 of the tubular housing 13; and is mounted so that a state is achieved wherein the first shaft end section 15*b* has passed through the other opening 18.

The circular cover member 22 is then screwed securely to the circular opening 21, resulting in a state wherein the joint shaft 15 is mounted in the tubular housing in a rotatable state. The oil seal 23 is inserted via the exterior of the opening 18, and the gap between the opening 18 and the joint shaft 15 is sealed.

The forward end 2*a* of the finger root 2 is then inserted via the rear-end opening 13A of the tubular housing 13, and the associated driving bevel gear 10 is made to mesh with the driven bevel gear 14. The shim plate 12 is inserted to adjust the state in which the gears are enmeshed and the bearing slide gap. Once the adjustments have been made, the tubular housing 13 and the tubular housing 7 of the finger root 2 are fastened and secured.

The tasks for installing the parts in the first joint section 3 of the present embodiment can thus be performed in an extremely straightforward manner. Furthermore, the installation requires fewer varieties of screws.

(Method of Assembling Second Joint Section)

The parts of the second joint section 5 can be assembled as described hereunder. First, the second bearing 59 and the driven bevel gear 56 are mounted on the joint shaft 57. The joint shaft 57 on which these sections have been mounted is inserted into the tubular housing 51 via the circular opening 53*c*. The first joint shaft section 57*a* is mounted in a state of protruding from the circular opening 53*c*.

The first bearing 58 is then mounted from the exterior via the circular opening 53*c*. The rear section 61*a* of the first swivel arm 61 is then secured to the first shaft end section 57*a* of the joint shaft 57, which protrudes from either side of the tubular housing 51. The rear section 62*a* of the second swivel arm 62 is secured to the second shaft end section 57*b*. The forward end sections of the first and second swivel arms 61, 62 are fastened and secured to each other. The first bearing 58 and second bearing 59, which have been mounted from the exterior via the circular openings 53*c*, 53*d* of the tubular housing 51, are therefore held from the exterior by the rear sections 61*a*, 62*a* of the first and second swivel arms 61, 62. Movement in the associated direction of thrust is accordingly restricted.

The forward end 4*b* of the finger body section 4 is subsequently inserted via the opening 52 of the tubular housing 51. The associated driving bevel gear 44 is made to mesh with the driven bevel gear 56. Inserting a shim plate 45 between the driving bevel gear 44 and the forward end surface of the forward end 4*b* makes it possible to adjust the state in which the gears are enmeshed and the bearing slide gap. Once the adjustments have been made, the tubular housing 51 and the tubular housing 41 of the finger body section 4 are fastened and secured.

The tasks for installing the sections in the second joint section 5 of the present embodiment can thus also be performed in an extremely straightforward manner. Furthermore, the installation requires fewer varieties of screws.

(Operational Effects of Multi-Joint Finger Unit)

The finger body section 4 in the multi-joint finger unit 1 having the aforedescribed structure can be made to swivel vertically within a substantially 180° range around the joint shaft 15 of the first joint section 3. Similarly, the fingertip section 6 can be made to swivel vertically within a substantially 180° range around the joint shaft 57 of the second joint section 5. Causing the finger body section 4 and fingertip section 6 to swivel either simultaneously or non-simultaneously allows a variety of movements required of a robot hand to be performed. According to a typical robot hand palm mechanism, a plurality of multi-joint finger units are attached to a common base plate, and are driven simultaneously or non-simultaneously.

The joint sections 3, 5 of the multi-joint finger unit 1 are covered by housings 13, 51, and the bevel gears and bearing sections are accommodated within a substantially sealed state. In the case that the multi-joint finger unit 1 is used in a place where thick powder dust is present, it is accordingly possible to prevent foreign matter from entering the gear meshing sections and the bearing sections, smooth action from being impaired, and other adverse events from occurring. Moreover, lubricant that has been applied or supplied to the gear meshing sections or bearing sections will be scattered outward. Therefore, in the case that the multi-joint finger unit is used in a clean room, the room will not be soiled thereby. The first joint section 3 in particular is sealed to a high degree, and is accordingly suited to being used in a clean room or other similar environment.

In the first joint section 3 of the present embodiment, only the large-diameter arcuate forward end section 25 of the arcuate forward end section 13B of the tubular housing 13 covers the driven bevel gear 14. Accordingly, the amount of extraneous space in the tubular housing 13 can be minimized. The rear-end section 4*a* of the finger body section 4 is brought closer to the small-diameter arcuate forward end section 24, and the distance between the rear-end section 4*a* and the joint shaft 15 is shortened. As a result, the swivel arm 20 linking the joint shaft 15 and the finger body section 4 can be shortened, and the load torque can be proportionally reduced (greater thrust can be achieved).

Other Embodiments

Only the first shaft end section 15*b* of the joint shaft 15 protrudes outward from the tubular housing 13 in the first joint section 3, and the swivel arm 20 is attached to the first shaft end section 15*b*. Alternatively, both ends of the joint shaft 15 may protrude from either side of the tubular housing 13, two swivel arms may be attached to the shaft end sections, and both swivel arms may support the finger body section 4.

In the second joint section 5, both ends of the joint shaft 57 protrude outward from the tubular housing 51, and two swivel arms 61, 62 are attached thereto. However, only one of the shaft end sections may be allowed to protrude, and one swivel arm may be attached thereto.

According to the above embodiment, the first joint section 3 and second joint section are of different construction. However, the first joint section 3 and second joint section 5 may both have the structure of the first joint section 3, or may both have the structure of the second joint section 5.

The invention claimed is:

1. A finger unit for a robot hand, comprising:
   a rotation actuator;
   a driving bevel gear that is secured in a coaxial state to a forward end of a rotation output shaft of the rotation actuator;
   a joint shaft that is arranged in a direction that is perpendicular to a central axis line of the rotation output shaft;
   a driven bevel gear, which is secured in a coaxial state to the joint shaft, and which meshes with the driving bevel gear;
   a swivel arm, which is linked to the joint shaft, and which extends in a direction that is perpendicular to the joint shaft;
   a finger body, which is linked to the swivel arm; and
   a tubular housing having a closed forward end section and a rear end constituting an opening; wherein
   the joint shaft, the driven bevel gear, and the driving bevel gear are accommodated in the tubular housing;
   at least a first shaft end section of shaft end sections of the joint shaft passes through the tubular housing and protrudes outward, and the swivel arm is linked to the first shaft end section on an exterior of the tubular housing; and
   the opening of the tubular housing is closed by a forward end section of a main body of the rotation actuator attached to the tubular housing;
   wherein:
   first and second openings are formed in positions on either end of the joint shaft in the tubular housing in an axis line direction;
   the first shaft end section protrudes to the exterior of the tubular housing via the first opening;
   the first shaft end section of the joint shaft is rotatably supported by a first bearing, which is attached at a site on an interior of the first opening in the tubular housing;
   a gap between the first opening and the joint shaft is sealed off using an oil seal;
   the second opening is closed by a cover member, which is screwed securely to the second opening; and
   a second shaft end section of the joint shaft is rotatably supported by a second bearing, which is attached to a circular recessed section formed on an interior end surface of the cover member.

2. The finger unit for a robot hand of claim 1, wherein:
   a shim plate, which is used for adjusting the state in which the driven bevel gear and the driving bevel gear are enmeshed or other states, is inserted between the driving bevel gear and a forward end surface of the forward end section of the main body of the rotation actuator.

3. A method of assembling the finger unit for a robot hand of claim 2, comprising:
   incorporating the driven bevel gear along with the first and second bearings on the joint shaft;
   inserting and positioning the joint shaft with the driven bevel gear, and the first and second bearings in the tubular housing via the second opening;
   screwing and securing the cover member on the second opening;
   mounting the oil seal;
   inserting, via the opening in the rear end of the tubular housing, a forward end section of the rotation actuator to which the driving bevel gear and shim plate have been attached, and causing the driving bevel gear to mesh with the driven bevel gear; and
   fastening and securing the rotation actuator to the tubular housing.

4. The finger unit for a robot hand of claim 1, wherein:
   first and second swivel arms are provided as the swivel arm;
   the first shaft end section and the second shaft end section of the joint shaft both protrude from the tubular housing;
   the first swivel arm is secured to the first shaft end section; and
   the second swivel arm is secured to the second shaft end section.

5. The finger unit for a robot hand of claim 4, wherein:
   first and second openings are formed in positions on either end along an axis line direction of the joint shaft in the tubular housing;
   the first shaft end section protrudes through the first opening;
   the second shaft end section protrudes through the second opening;
   the joint shaft is supported in a rotatable state by a first bearing, which is mounted between an inner peripheral surface of the first opening and the first shaft end section, and a second bearing, which is mounted between an inner peripheral surface of the second opening and the second shaft end section; and
   movement in the axis line direction of the first bearing and second bearing is restricted by the first swivel arm and the second swivel arm.

6. The finger unit for a robot hand of claim 5, wherein:
   a shim plate, which is used for adjusting the state in which the driven bevel gear and the driving bevel gear are enmeshed or other states, is inserted between the driving bevel gear and a forward end surface of the forward end section of the main body of the rotation actuator.

7. A method of assembling the finger unit for a robot hand of claim 6, comprising:
   incorporating the driven bevel gear and the second bearing on the joint shaft;
   inserting and positioning the joint shaft with the driven bevel gear and the second bearing in the tubular housing via the second opening;
   mounting the first bearing between the first opening and the first shaft end section from the exterior;
   securing the first swivel arm and second swivel arm to the first and second shaft end sections;
   inserting, via the opening in the rear end of the tubular housing, a forward end section of the rotation actuator to which the driving bevel gear and shim plate have been attached, and causing the driving bevel gear to mesh with the driven bevel gear; and
   securing the rotation actuator to the tubular housing.

8. The finger unit for a robot hand of claim 4, wherein:
   forward end sections of the first swivel arm and the second swivel arm are bent toward the axis line direction of the joint shaft and extend in a direction of getting closer to each other; and
   the forward end sections are linked and secured to each other.

9. The finger unit for a robot hand of claim 4, wherein:
   a shim plate, which is used for adjusting the state in which the driven bevel gear and the driving bevel gear are enmeshed or other states, is inserted between the driving bevel gear and a forward end surface of the forward end section of the main body of the rotation actuator.

10. A finger unit for a robot hand, comprising:
    a rotation actuator;

a driving bevel gear that is secured in a coaxial state to a forward end of a rotation output shaft of the rotation actuator;

a joint shaft that is arranged in a direction that is perpendicular to a central axis line of the rotation output shaft;

a driven bevel gear, which is secured in a coaxial state to the joint shaft, and which meshes with the driving bevel gear;

a swivel arm, which is linked to the joint shaft, and which extends in a direction that is perpendicular to the joint shaft;

a finger body, which is linked to the swivel arm; and a tubular housing having a closed forward end section and a rear end constituting an opening; wherein the joint shaft, the driven bevel gear, and the driving bevel gear are accommodated in the tubular housing;

at least a first shaft end section of shaft end sections of the joint shaft passes through the tubular housing and protrudes outward, and the swivel arm is linked to the first shaft end section on an exterior of the tubular housing; and the opening of the tubular housing is closed by a forward end section of a main body of the rotation actuator attached to the tubular housing;

wherein:

the forward end section of the tubular housing is an arcuate forward end section, which protrudes in an arcuate shape around the joint shaft;

the only section of the arcuate forward end section that covers the driven bevel gear is a second arcuate forward end section, whose radius is larger than a first arcuate forward end section; and a rear end of the finger body is configured so as to swivel around the joint shaft and along an exterior surface of the first arcuate forward end section.

\* \* \* \* \*